Dec. 20, 1966  A. M. HARRIS  3,293,136
NUCLEAR REACTOR AND METHOD FOR REFUELING SAME
Filed Aug. 13, 1964  5 Sheets-Sheet 4
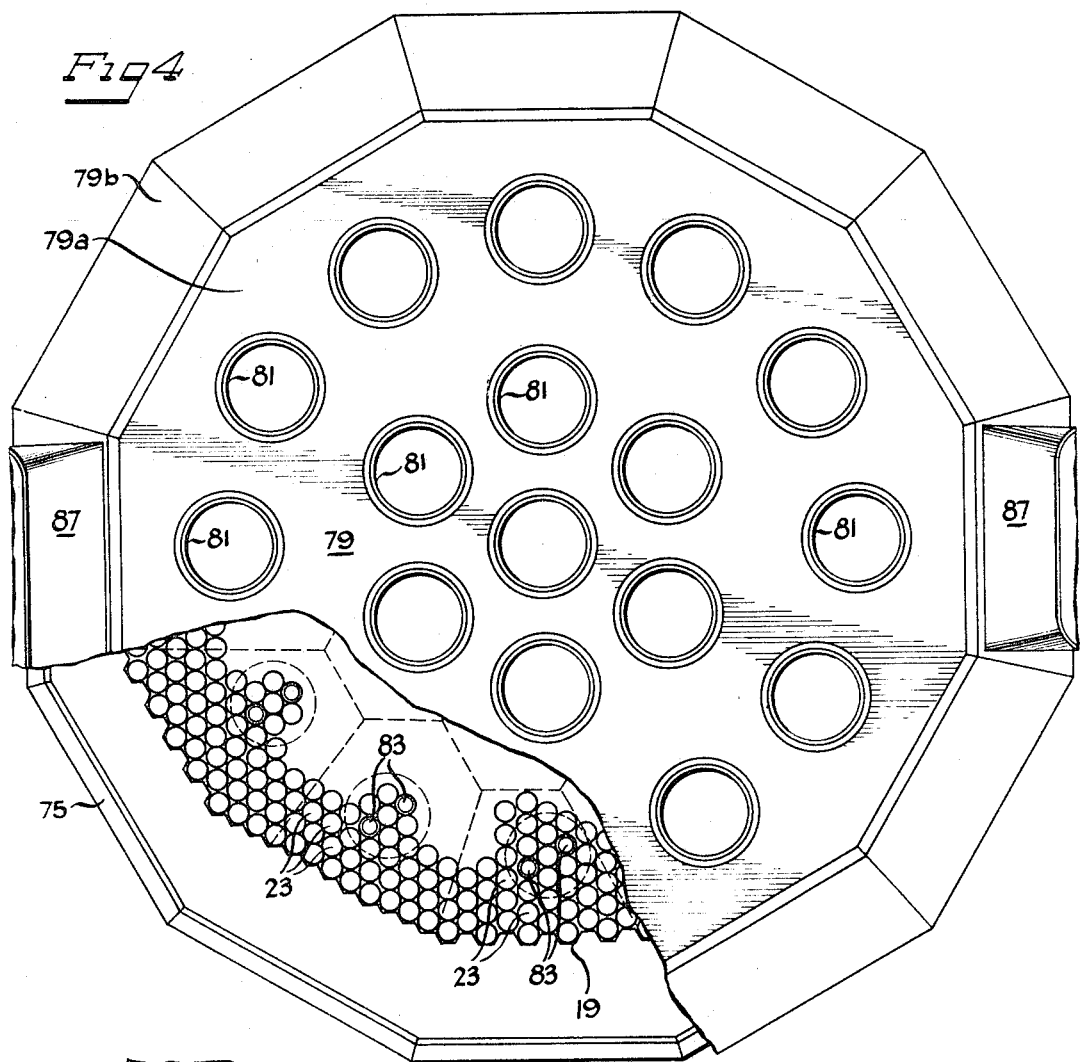
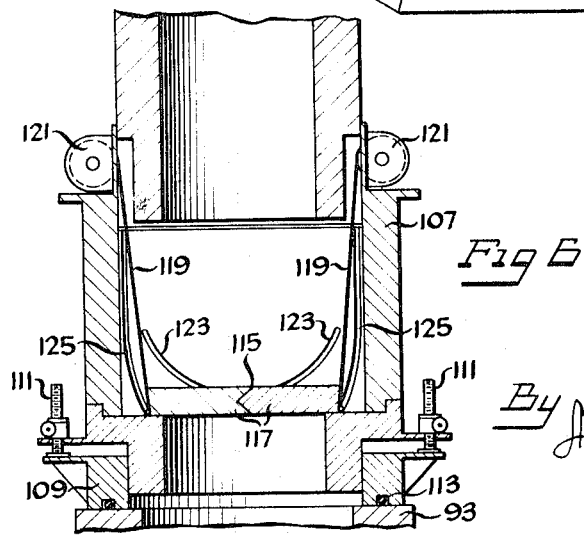
Inventor
Arthur M. Harris
By Anderson, Luedeka, Fitch, Even & Tabin
Att'ys

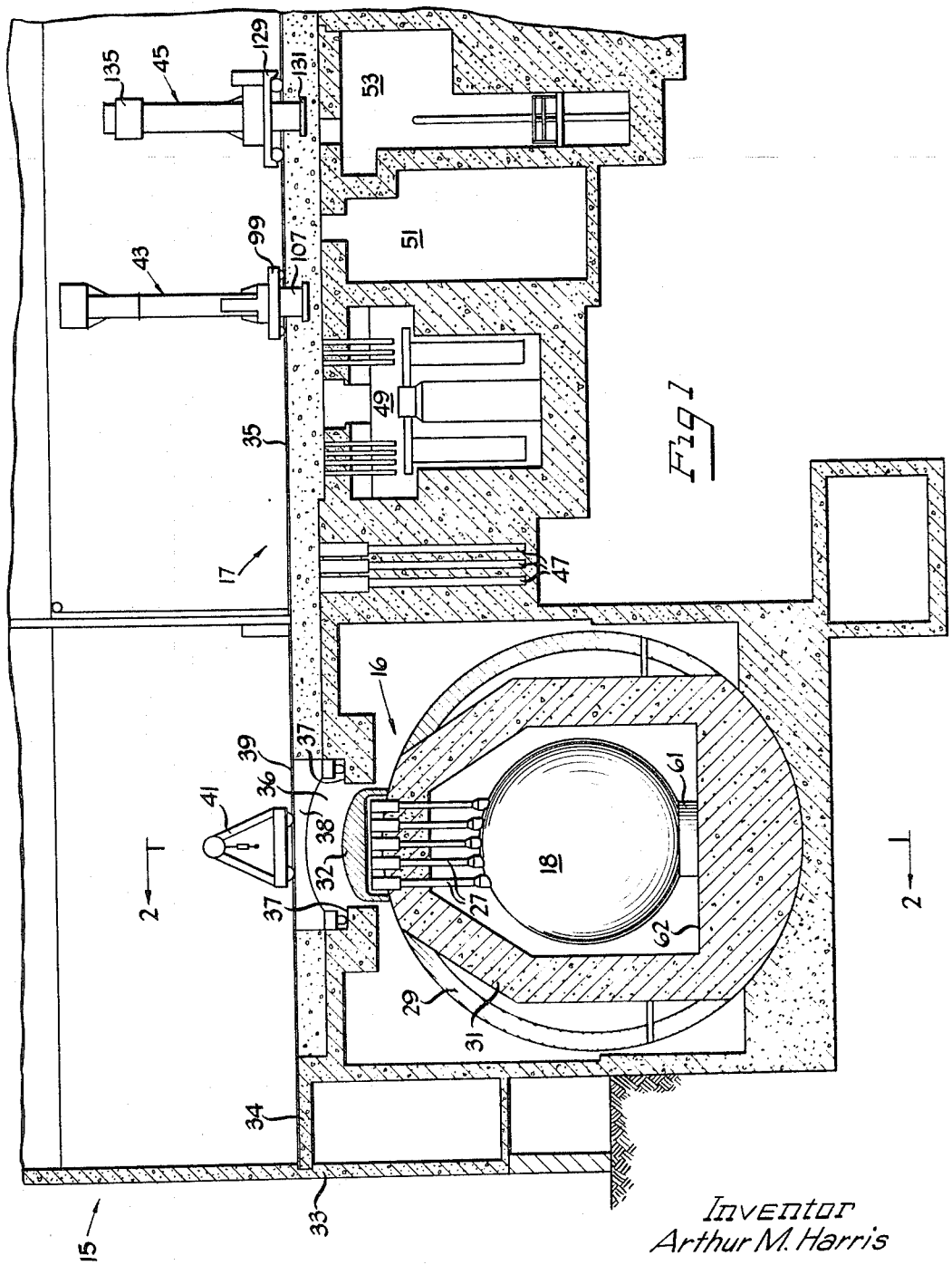

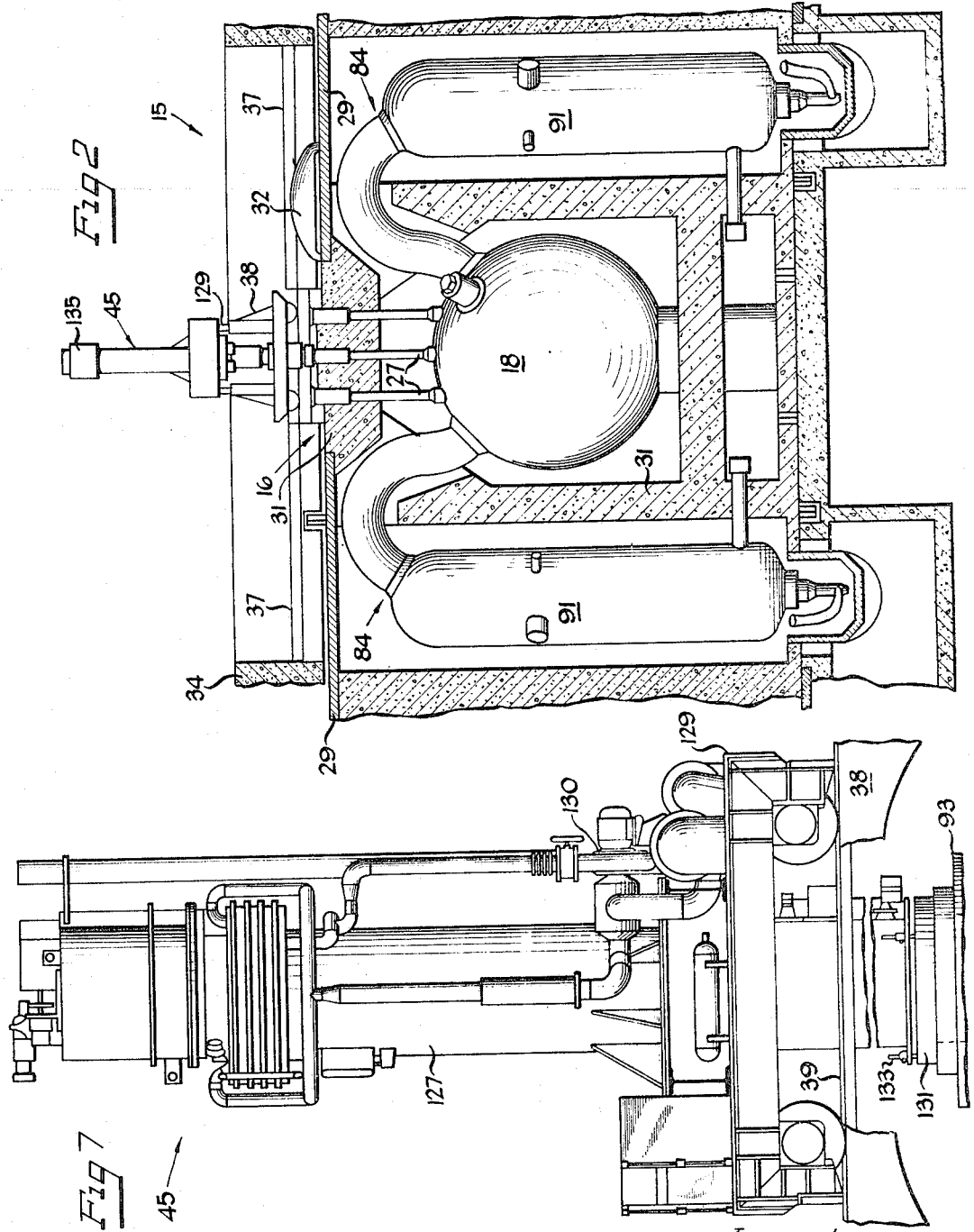

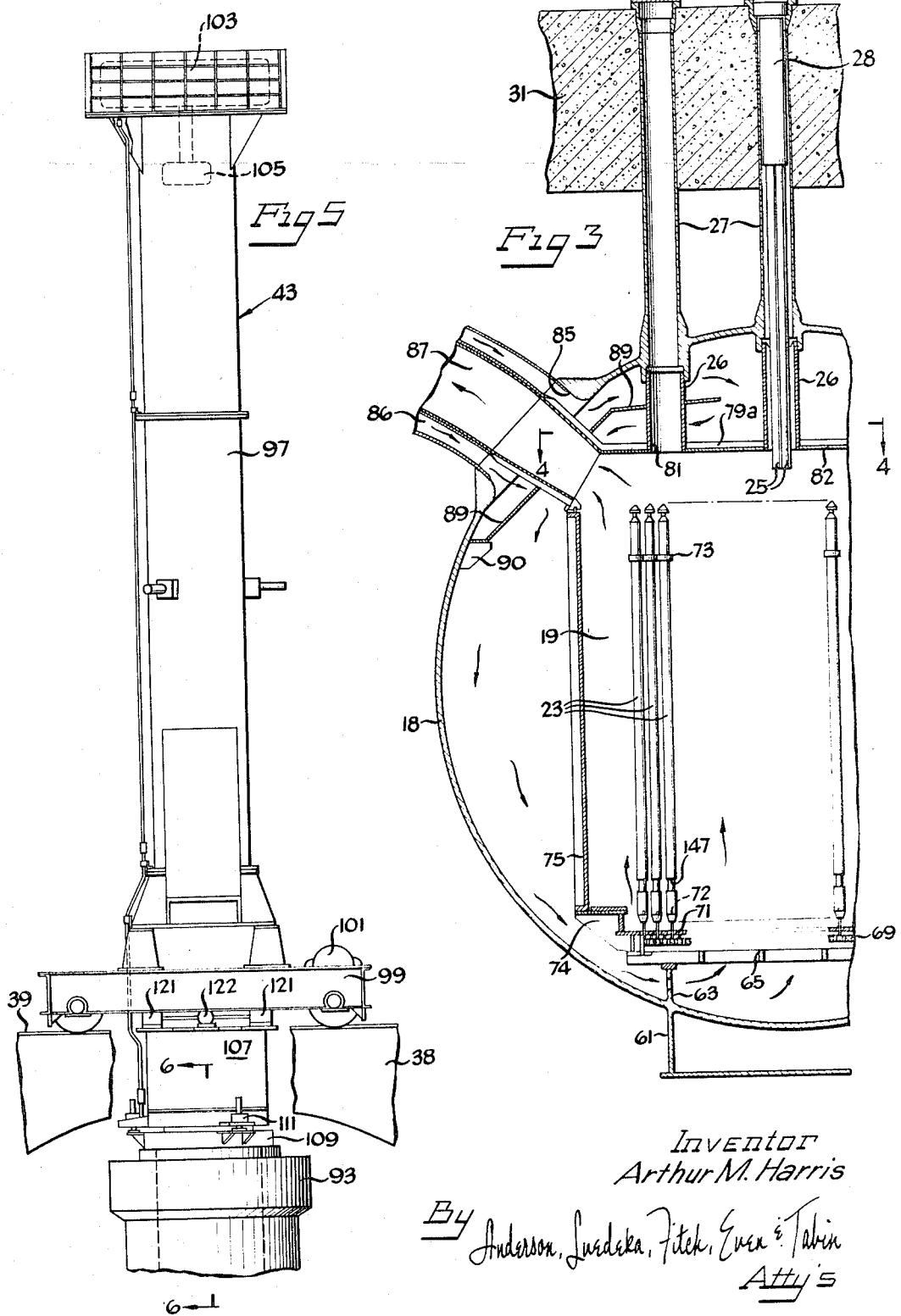

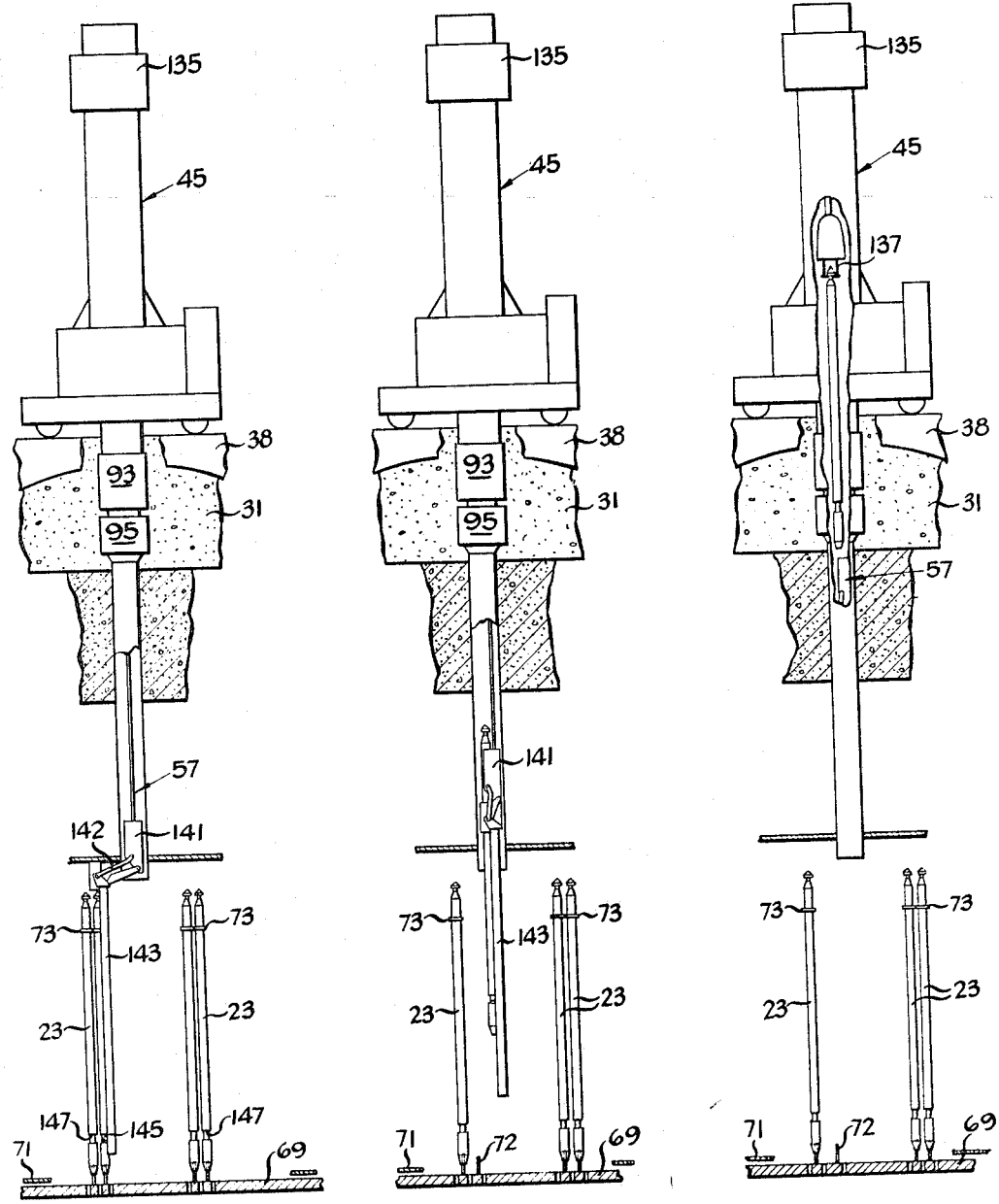

United States Patent Office 3,293,136
Patented Dec. 20, 1966

1

3,293,136
NUCLEAR REACTOR AND METHOD FOR REFUELING SAME
Arthur M. Harris, San Diego, Calif., assignor to General Dynamics Corporation, New York, N.Y., a corporation of Delaware
Filed Aug. 13, 1964, Ser. No. 389,296
10 Claims. (Cl. 176—39)

The present invention relates to nuclear reactors, and more particularly to a reactor design which permits the use of a relatively short pressure vessel and to a method of loading and refueling such a reactor.

Because of the relatively large capital cost of large power reactors, it is important that reactor designs take advantage of possible savings in cost of reactor construction. The pressure vessel of a nuclear reactor represents a considerable capital cost. Furthermore, the size of a pressure vessel for a nuclear reactor has often required that final assembly be completed at the site of the plant. Reactor designs are therefore desired which minimize the size of the pressure vessels.

When nuclear reactors utilizing a core of parallel vertically extending, elongated fuel elements are designed to operated with relatively small pressure vessels, the problems attendant to loading and refueling must be taken into consideration. It has generally been necessary to provide reasonable space in the pressure vessel above the top of the core to permit operation of handling equipment for engaging, raising and positioning the fuel elements to insert them into or extract them from the pressure vessel.

The total length of the shut-down period required to accomplish refueling is also important to the operating economics of a reactor. It is desirable that shut-down time be kept as short as possible and that refueling take place as rapidly as possible commensurate with radiological safety to personnel. An efficient system which can accomplish refueling of a nuclear reactor in a minimum of time is therefore desired.

A principal object of the present invention is the provision of novel nuclear reactor designs utilizing a relatively small pressure vessel.

Another object of this invention is to provide an improved method for loading and refueling a nuclear reactor.

A further object is to provide an improved method for loading and refueling a gas-cooled nuclear reactor utilizing a core of parallel elongated fuel elements which core occupies the majority of the space within the pressure vessel. A still further object is to provide a nuclear reactor of the type described of relatively simple and economical construction which is also effective and dependable.

These and other objects of the invention are more particularly set forth in the following description and the accompanying drawings wherein:

FIGURE 1 is a view partially in section of a portion of a nuclear power plant embodying various features of the present invention, illustrating a gas-cooled nuclear reactor, a reactor service area and associated equipment for handling reactor components;

FIGURE 2 is an enlarged view partially in section taken generally along line 2—2 of FIGURE 1 as refueling of the reactor is in progress;

FIGURE 3 is an enlarged fragmentary view partially in section of the nuclear reactor pressure vessel showing the reactor core construction;

FIGURE 4 is an enlarged fragmentary plan view of the core of the nuclear reactor with the pressure vessel omitted, looking along line 4—4 of FIGURE 3 and with parts broken away to show details of reactor core;

FIGURE 5 is an enlarged front view of one piece of equipment, an auxiliary transfer cask, shown in FIGURE 1 and illustrated in its operational position;

2

FIGURE 6 is an enlarged sectional fragmentary view of the lower portion of the auxiliary transfer cask shown in FIGURE 5, taken generally along line 6—6 of FIGURE 5;

FIGURE 7 is an enlarged front view of another piece of equipment, a fuel transfer cask, shown in FIGURE 1, illustrated in its operational position; and FIGURES 8, 9 and 10 are a series of diagrammatic views showing the removal of a fuel element from the reactor core.

Briefly, the invention provides a novel reactor design employing a pressure vessel that is only slightly larger than a reactor core of a particular type together with novel means for loading and refueling the core. This particular type of reactor core is made up of a generally cylindrical arrangement of elongated fuel elements and other core elements.

A reactor design in accordance with this invention is particularly suitable for gas-cooled nuclear reactors employing a core formed of closely spaced, vertically extending, parallel fuel elements. Accordingly, the invention is illustrated and described with reference to such a reactor. However, it should be understood that the invention may also be applicable to other reactors using fluid coolants, gas or liquid.

As used in this application, the term core elements includes fuel elements, control rods, control rod guide tubes and rod-like elements, such as reflector elements, which may reside in the reactor core. The top of the pressure vessel is penetrated by a plurality of nozzles in which the drive mechanisms for the control rods reside when the nuclear reactor is operating. It is through these nozzles that refueling of the reactor core is accomplished.

There are sufficient nozzle to accommodate the necessary control rod drives, and the total cross-sectional area of all the nozzles is substantially less than the cross-sectional area of the reactor core. Consequently, only a minority of the elongated fuel elements are axially aligned with nozzle openings so that they may be removed by simply lifting them axially. However, with the aid of special handling equipment it has been found that it is possible to remove the fuel elements from an extended region of the core, which surrounds the vertical center line of a nozzle, and efficiently replace them with fresh fuel elements through that nozzle.

Briefly, refueling is accomplished by removing the control-rod drive mechanism from a selected nozzle and initially withdrawing the core elements which occupy the central portion of the core zone and thus are in complete axial alignment with the access opening provided by removal of the drive mechanism. These core elements are lifted by a simple grapple mechanism in a generally straight line, vertically through the access opening in the nozzle.

A fuel element handling machine is inserted into the nozzle in location where the control rod drive mechanism formerly resided. This machine has an extensible leg which is adapted for downward movement into the region of the reactor core vacated by the removal of the central core elements and then for lateral movement to engage any fuel element remaining in this core zone. The leg repositions the core element laterally until it is in axial alignment with the access opening. Once axially aligned with the access opening, the fuel element is raised vertically through the nozzle until it can be grasped by equipment exterior of the pressure vessel and removed thereby.

Fresh fuel elements are loaded into the core by reversing order of the above operations. Thus, a zone of the reactor core substantially greater in size than the cross-sectional area of the access opening in the pressure vessel may be service and/or refueled without the necessity of a large clearance space between the fuel elements in the reactor core and the upper wall of the pressure vessel through which they are loaded and unloaded.

Now, referring to the drawings, FIGURE 1 illustrates portions of a nuclear power plant 15 including a gas-cooled nuclear reactor 16 and an associated reactor service area 17. The illustrated reactor 16 includes a generally spherical pressure vessel 18, made of a high strength material such as steel, which houses a reactor core or core arrangement 19. As shown best in FIGURES 3 and 4, the illustrated reactor core 19 comprises an upright generally cylindrical package or bundle of elongated fuel elements 23 which are disposed upright and immediately adjacent to one another. Control rods 25 are vertically selectively extensible into and out of the core 19.

A plurality of generally regularly spaced axially vertical control rod nozzles 27 extend upward from the upper portion of the spherical pressure vessel 18 and are in communication with the interior of the vessel. Each of the control rod nozzles 27 (see FIG. 3) removably houses a control rod drive mechanism 28 for raising and lowering a pair of control rods 25. With the control rod drive mechanism 28 removed, the control rod nozzles 27 serve as access ports into the spherical pressure vessel 18 and the core 19.

As best seen in FIGURES 1 and 2, a generally cylindrical, secondary containment vessel 29, made of a high strength material such as steel, surrounds the spherical pressure vessel 18. The secondary containment vessel 29 also holds a concrete biological shield 31. Sections of the cylindrical vessel 29 at the top and at the bottom are cut away and are filled generally by the concrete shield 31. Appropriate channels in the top of the concrete shield 31 provide passageways through which the control rod nozzles 27 extend. A nozzle cover 32 is provided for the top of the portion of the biological shield 31 in which the nozzles 27 are installed. The nozzle cover 32 is part of the secondary containment system and includes internal honeycomb material (not shown) for absorbing the energy of any pieces of a nozzle which might fail and be blown upward.

The cylindrical secondary containment vessel 29 is disposed and supported within a reactor building 33. The building 33 contains an operating floor 34 which extends over the vessel 29. A set of rails 35, which run along the floor 34 between the reactor 16 and the reactor service area 17, provide a path for reactor service equipment. There is an open trench in the floor 34 between the rails 35 which provides clearance for some of the service equipment that extends below the level of the rails 35. An opening 36 at the bottom of the trench above the reactor provides access to the control rod nozzles 27.

At the point of the opening 36, there is a cross trench in the floor 34, which has formed at its bottom a pair of cross tracks 37 that flank the opening 36 and support the wheels of a movable bridge 38. Thus, the bridge 38 is movable in the cross trench in a direction perpendicular to the rails 35 and spans the opening 36. The bridge 38 carries short rail sections 39 which can be aligned with the rails 35 and thus support equipment directly above the opening 36 to the reactor 16. Equipment may be accurately positioned above any desired control rod nozzle 27 by the combined movement of the bridge 38 and the equipment along the bridge 38. The bridge 38 is, of course, open intermediate the short rail sections 39.

The various reactor service equipment which is moved along the rails 35 includes (see FIG. 1) an auxiliary hoist 41 (if no overhead building crane is provided), an auxiliary transfer cask 43, and a fuel transfer cask 45. Each of these pieces of equipment is mounted upon a dolly or carriage adapted for movement along rails. This equipment is designed to service the reactor 16 and to transfer components between the reactor 16 and various locations in the reactor service area 17, such as storage wells 47 for control rod drives, a fuel storage vault 49, a fuel element loading area 51 and a hot service facility 53.

Briefly, the auxiliary hoist 41 is used to uncover the control rod nozzles 27 and to prepare the selected nozzle for the refueling operation. The auxiliary transfer cask 43, best seen in FIG. 5, is used to remove and insert the control rod drive mechanisms 28 and a fuel element handling machine 57 (see FIGS. 8 through 10) which is used to remove core elements from each zone that are not axially aligned with a nozzle 27. The fuel transfer cask 45, best seen in FIGURE 7, is used to insert and remove core elements and transport them to and from the reactor service area 17.

Now referring in detail to the construction of the particular nuclear reactor 16 illustrated, best seen in FIGURES 3 and 4, the spherical pressure vessel 18 is supported on a tubular stand 61 that spaces the pressure vessel 18 above a flat supporting surface 62 (FIG. 1) at the bottom of a cavity formed within the biological shield 31. A coaxial tubular support 63 of like diameter is disposed internally of the pressure vessel 18 and supports a girder assembly 65 on which rests a grid plate 69. Supported in spaced relation to the grid plate 69 is a neutron shield 71.

To support the fuel elements 23 in the reactor core 19, a plurality of stand-off pins 72, one for each fuel element 23, are mounted in the grid plate 69. Each fuel element 23 is provided with a mating hole in its bottom that accepts the stand-off pin 72. Thus, each pin 72 serves to support and to locate the lower end of a fuel element 23 in its desired position in the reactor core 19. One or more spacing rings 73 may be provided at the same location on the body of each fuel element 23 so that adjacent elements will remain spaced apart the desired distance near their upper ends and provide mutual lateral support for one another.

Mounted near the outer edges of the girder assembly 65 are support brackets 74 which support an upwardly extending lateral thermal shield 75 that circumferentially surrounds the reactor core 19. As best seen in FIGURE 4, the illustrated thermal shield 75 is comprised of twelve vertical side plates which are joined along their edges. The lateral thermal shield 75 is substantially gas-tight and directs the flow of the coolant gas, as will be fully described hereinafter. Moreover, the core elements that are located along the perimeter of the reactor core 19, which may if desired be reflector elements, are in contact with the lateral thermal shield 75 and are thereby laterally supported.

To seal the top of the reactor core 19, a plenum shroud 79 spans the top of the lateral thermal shield 75. The plenum shroud 79 includes a flat center portion 79a and a downwardly inclined peripheral flange 79b. The flange 79b is deformed into twelve sections by which attachment is made with the twelve sides of the lateral thermal shield 75. The underside of the plenum shroud 79 is coated with a coating of refractory insulation to serve as an upper thermal barrier 82. To establish communication between the control rod nozzles 27 and the reactor core 19, an extension 26 is provided at the lower end of each of the control rod nozzles 27 and is seated in a suitable aperture 81 in the plenum shroud 79. Each of the nozzles 27 is suitably closed and sealed by a blind flange or cover plate 80 to maintain the pressurized integrity of the coolant system within the pressure vessel 18.

In the illustrated reactor 16, nineteen control rod nozzles 27 are provided, arranged as shown in FIGURE 4. The position of the nozzles 27, relative to the core elements, is illustrated in the broken-away portion of FIGURE 4 by superimposed circular broken-line representations of the access openings through the nozzles. In a cluster directly below each of the control rod nozzles 27, there are disposed five fuel elements 23 and two guide tubes 83 in which two control rods 25 are usually at least partially disposed when the reactor 16 is operating. These seven core elements are referred to as the central core elements in a zone, and the remainder of the fuel elements 23 in the zone, which surround them, are hereinafter referred to as peripheral core elements. The control rod drive mechanism 28 that is disposed in the nozzle 27 during operation of the reactor 16 controls both control rods 25 which move in the two control rod guide tubes in a zone, raising and lowering them to control operation of the reactor.

As best seen in FIG. 2, duplicate heat extraction systems 84 are provided in the reactor 16. To establish fluid communication between the heat extraction systems 84 and the interior of the pressure vessel 18, ports 85 are provided at opposite sides of the pressure vessel 18. Coaxial inlet conduits 86 and outlet conduits 87 (see FIG. 3) pass through each port 85. The outlet conduit 87 is disposed centrally within the inlet conduit 86, thus necessitating only one high pressure joint at each port 85.

In the illustrated reactor, a suitable gas, such as helium or carbon dioxide, is circulated through the reactor 16 and the heat extraction systems 84. The gas stream enters the reactor 16 at a relatively low temperature to thereby act as a coolant for the reactor core 19, and leaves the reactor 16 at an elevated temperature to thereby carry heat to the heat extraction systems 84. To direct the incoming coolant stream upward to the top of the pressure vessel 18 before it is directed down the sides of the vessel to the bottom of the core 19, an annular baffle 89 is disposed in the upper portion of the pressure vessel 18. The baffle 89 is mounted at its outer edge to the interior wall of the pressure vessel 18 by support brackets 90.

The flow of the gas coolant is indicated by small arrows in FIGURE 3. The coolant enters through the inlet conduits 86, passes upward over the baffle 89 and then across the top of plenum shroud 79 to the periphery of the core 19. The coolant then passes downward between the lateral thermal shield 75 and the pressure vessel 18 to the bottom of the core 19, and then upward through the core 19 between the fuel elements 23.

A minor fraction of the coolant stream may be passed through the fuel elements 23, if desired, to provide a purge stream for fission products produced during operation of the reactor 16. With fuel elements of this type, means are provided for withdrawing the purge flow of gas through the stand-off pins 72 and then through a suitable conduit network (not shown).

The heated coolant exits from the pressure vessel 18 through the outlet conduits 87 which lead to steam generators 91 (FIG. 2). The coolant flows in a closed circuit, and after the useful heat has been extracted from the coolant in the steam generators 91, the coolant is returned to the pressure vessel 18 via the inlet conduits 86 for recirculation through the core 19. If desired, suitable means (not shown) may be provided for purifying and supplementing the coolant. The steam generated is used by suitable equipment, such as steam turbines (not shown), for the production of power.

As can be seen in FIG. 3, the generally cylindrical reactor core 19, containing the adjacent, axially vertical fuel elements 23, occupies the major portion of the spherical pressure vessel 18. The maximum diameter or height of the pressure vessel 18 is substantially less than twice the length of a fuel element 23, and the volume of the core 19 occupies substantially more than one-half the volume of the spherical pressure vessel 18.

Moreover, the clearance above the top of the reactor core 19, defined by the plenum shroud 79, is only about one-tenth of the length of fuel elements 23. It is clear that many of the fuel elements 23, i.e. the peripheral fuel elements 23 which are not directly below a nozzle 27, cannot be removed from the core 19 by lifting them directly upward. However, as best seen in FIGURE 3, the clearance between the tops of the fuel elements 23 and the plenum shroud 79 is sufficient to allow any fuel element to be lifted vertically clear of the stand-off pin 72 upon which it is supported. The removal of the axially non-aligned or peripheral fuel elements 23 in a zone is described in detail hereinafter.

In the refueling procedure, after the cover 32 has been removed from the top of the secondary containment vessel 29 by the auxiliary hoist 41 so that the tops of the nozzles 27 are exposed, the blind flange 80 is removed and an adapter spool 93 and an isolation valve 95 are connected to the selected nozzle 27 through which unloading is to first take place. The adapter spool 93 is designed to facilitate connection between the casks 43 and 45 and the selected nozzle 27.

The adapter spool 93 is generally pipe-shaped, having a vertical, central bore generally larger than the inner diameter of the nozzle 27. To seal the nozzle 27 when the control rod drive mechanism 28 is removed and thereby prevent escape of contaminated coolant outside the reactor, the isolation valve 95, which may for example be a gate valve 95, is provided at the lower end of the adapter spool 93. The lower end of the isolation valve 95 is sealed to the upper end of the selected nozzle 27 by a spring-loaded bellows (not shown) contained within the body of the isolation valve 95. By closing the isolation valve 95, escape of contamination outside the reactor is prevented. This arrangement is especially important when a gas that is lighter than air, such as helium, is used as a coolant for it would readily escape if the nozzle is not sealed.

To afford radiation protection to the personnel conducting the refueling, the adapter spool 93 is preferably shielded by a suitable material such as lead. The isolation valve 95 is similarly shielded. The shielding is such that the maximum radiation exposure to the operating personnel working in this location is well within permissive limits even when a spent fuel element 23 is passing through the open valve 95.

After the adapter spool 93 and isolation valve 95 have been set in place, the auxiliary transfer cask 43, best seen in FIGS. 5 and 6, is positioned over the reactor nozzle 27 and sealed to the adapter spool 93. This cask 43 is used to remove the control rod drive mechanism 28 from the nozzle 27 and to transport it to a storage well 47.

The illustrated auxiliary transfer cask 43 includes an axially vertical, hollow cylindrical housing 97 which is mounted upon a wheeled dolly 99 adapted for movement along the rails 35 and the short rail sections 39 on the bridge 38. The illustrated transfer cask 43 also includes drive means 101 mounted on the carriage 99 so that it is self-propelled.

An electric hoist 103 is disposed at the upper end of the cask housing 97. The hoist 103 includes a grapple 105 that matches lifting adapters (not shown) on the equipment to be handled by the cask 43, e.g., the control rod drive mechanisms 28 and the core element handling machine 57.

To connect with the top of the adapter spool 93, the cask housing 97 is provided with a hollow lower section 107, which extends below the level of the rails 35 and rides in the trench, to facilitate connection to the adapter spool 93. The lower section 107 of the cask is generally square in internal cross section and carries a vertically movable shielded skirt 109. The skirt 109 is tubular in shape and effects a sealed connection to the upper end of the adapter spool 93. The skirt 109 is raised and lowered by screw jacks 111 which are driven by a suitably connected motor (not shown). A suitable sealing device, such as an inflatable rubber seal (not shown) is disposed between the skirt 109 and the outer wall of the lower cask section 107. An O-ring 113 is provided in the lower face of the skirt 109 which seals the connection between it and the adapter spool 93.

As illustrated in FIG. 6, the lower section 107 of the cask 43 is provided with a gate 115 to close its square internal opening. The gate 115 includes a pair of mating leaves 117 which interengage along their front edges to form a generally horizontal closure. To operate the gate 115, two cables 119 are attached to the rear edges of each of the leaves 117 and extend upwardly to rotatable drums 121. A small reversible motor 122 (see FIG. 5) drives each pair of drums 121 so the gate leaves 117 can be hauled up or lowered, as desired. Guide slots 123 are cut in opposite internal walls of the lower section 107. Pins (not shown) set in the sides of the leaves 117 ride in these slots 123 and guide the mating edges into interengagement when the gate 115 is closed. A pair of rear guide plates 125 assure that the front edges of the leaves 117 meet when the gate 115 is closed.

The gate leaves 117 are made of a heavy material which has good radiation shielding properties, such as lead. The weight of the leaves 117 allows gravity to be relied upon to close the gate 115. Furthermore, the lead leaves 117 provide protection for personnel against excessive radiation from radioactive equipment being removed from the reactor 16.

After the control rod drive mechanism 28 has been removed, the fuel transfer cask 45, best seen in FIG. 7, is positioned on the bridge 38 over the adapter spool 93 and is used to handle and transport fuel elements 23 and control rod guide tubes 83. The fuel transfer cask 45 includes a tubular, axially vertical body 127 which is mounted on a self-propelled wheeled dolly 129 adapted for travel along the rails 35. A suitable gas circulation system 130 is provided to maintain the desired environmental conditions within the fuel transfer cask 45. The cask 45 can receive, and store for an indefinite period, either five fuel elements 23 and two control rod guide tubes 83 or six fuel elements 23. The cask body 127 contains sufficient radiation shielding to suitably protect personnel.

The fuel transfer cask body 127 extends below the level of the rails 35, as does the auxiliary transfer cask 43, so that its lower end is in proximity with the top of the adaptor spool 93. To establish a seal with the top of the adapter spool 93, a vertical movable skirt 131 is supported at the lower end of the body 127 by screw jacks 133. The skirt 131 is similar in construction to the skirt 109, being of radiation shielding material. The jacks 133 are also driven in a like manner so the skirt 131 can be lowered to engage the top of the adaptor spool 93. Inflatable seals (not shown) are used to prevent gas leakage between the skirt 131 and the cask body 127. An O-ring (not shown), similar to O-ring 113, is provided in the lower face of the skirt 131 to seal the connection between it and the adapter spool 93.

To prevent the escape of radioactive matter from the cask 45 when it is traveling between the reactor 16 and the reactor service area 17, a closure is disposed internally of the body 127 near the bottom thereof. The closure comprises two appropriately sealed, eccentrically mounted, rotatable disks (not shown), each having an opening formed therein. By rotating the disks, the openings can be selectively aligned to provide an entrance through the closure below various locations in the cask 45 which correspond to the relative locations of the seven central core elements.

To extract the fuel elements 23 and the control rod guide tubes 83 from the reactor 16, a grappler hoisting and positioning device 135 is mounted at the upper end of the fuel transfer cask body 127. The device 135 can be operated to lower and to raise a grappler 137 (FIG. 10) and to operate the grappler 137 to grasp the core elements. Moreover the device 135 can be driven to change the azimuth and radial disposition of the grappler 137 so it can be located directly above, i.e. in axial alignment with, any one of the seven central core elements (see FIG. 4) in a refueling zone below a nozzle 27. Likewise, openings through the disks can be aligned to coincide with these locations. The body 127 of the fuel transfer cask is provided with a suitable storage rack arrangement (not shown) to securely engage and hold the core elements after they have been lifted thereinto.

After the seven central core elements in a selected refueling zone have been removed, the auxiliary transfer cask 43 is used to transport the core element handling machine 57 to the reactor and lower it into the vacated control rod nozzle 27. Suitable seals are provided between the core element handling machine 57 and the nozzle 27 to prevent leakage of the coolant from the reactor to the atmosphere. Core element handling machine 57 also contains an isolation valve (not shown) in its upper portion which is closed whenever a cask is not positioned above the handling machine.

As shown in FIGURES 8, 9 and 10, the core element handling machine 57, after positioning within a nozzle 27, is designed to remove the peripheral fuel elements 23 in the associated core zone, i.e., the fuel elements 23 which surround the seven central core elements in a zone and which are out of complete axial alignment with a pressure vessel access opening provided by a nozzle 27. One example of a suitable core element handling machine 57 is fully illustrated and described in detail in pending U.S. Patent Application Serial No. 309,499, filed September 17, 1963, now Patent No. 3,253,995.

After the core element handling machine 57 is in position, the auxiliary transfer cask 43 is removed, the empty fuel transfer cask 45 is repositioned over the adapter spool 93 and connected thereto, and the isolation valve in the handling machine 57 is opened. The core element handling machine 57 includes an internal carriage 141, which, via a cross-link 142, supports a depending elongated leg or channel 143 of a length generally equal to that of a fuel element 23. When the core element handling machine 57 is actuated, the internal carriage 141 is lowered, thus lowering the leg 143 down into the space in the reactor core provided by the removal of the seven central core elements in the zone. To grasp the fuel elements 23, a grappler which includes a pair of relatively movable jaws 145 is supported between the flanges of the channel for relative vertical movement therewithin.

After the channel 143 has reached its lowest position, the handling machine 57 is controlled to rotate the channel 143 to the desired azimuth and to move it radially outward toward a selected fuel element 23, as shown in FIG. 8. When this position has been reached, the grappler is actuated to close the jaws 145 and engage the fuel element 23 about a recessed section thereof, near its bottom, which provides an annular ledge 147 against which the jaws 145 may bear when lifting the fuel element 23. The grappler jaws 145 are driven upward sufficient distance to lift the fuel element 23 off its stand-off pin 72. When the fuel element 23 is clear of the stand-off pin 72, the channel 143 is retracted radially to a location directly below the nozzle 27. In this position, the carriage 141 is actuated to raise the channel 143 and also to raise the grappler jaws 145 within the channel 143 (see FIG. 9).

When the handling machine 57 has completed its upward movement, the fuel element 23 extends upwardly past the top of the nozzle 27. In this position, the upper end of the fuel element 23 is easily engaged by the grappler 137 of the fuel transfer cask 45, as shown in FIG. 10, which raises it into a storage compartment in this cask.

This procedure is repeated until the fuel transfer cask 45 is filled, in the illustrated apparatus, when six fuel elements 23 have been withdrawn from the reactor 16. The withdrawn fuel elements 23 are transferred to the fuel element storage vault 49. Obviously, the procedure can be carried out in reverse to insert fresh fuel elements 23 into proper position in the reactor core 19 and thereby complete refueling.

The following is a brief summary of a typical refueling operation. Subsequent to reactor shutdown, sufficient time is allowed for reactor cool off and for coolant cleanup and depressurizing. During refueling, circulation of coolant is continued, and inlet pressure and temperature are maintained at approximately 14.5 p.s.i.a. and 250° F., respectively.

As previously indicated, refueling of the reactor 16 is accomplished by sequentially refueling individual zones of the reactor core 19. In the illustrated reactor 16, each zone contains about forty-seven fuel elements and two control rods, and the refueling of each zone is accomplished through the nozzle 27 disposed above and generally centrally of that zone.

If the entire core 19 were to be refueled at one time, each of the nineteen control rod drive nozzles 27 would be used for refueling operations. However, if for example, a six-year refueling cycle is employed, only three or four nozzles 27 are opened in an average year. In such an average refueling year, about one hundred and sixty fuel elements are replaced, and replacement is accomplished in a period of less than two weeks. The spent fuel elements which are removed from the reactor 16 are generally allowed to remain in the fuel storage vault 49 for a decay period before they are shipped for reprocessing.

When the cool off and depressurization period has run, the nozzle cover 32 is removed from the secondary containment vessel 29 using the auxiliary hoist 41, and the adapter spool 93 and isolation valve 95 are positioned upon a selected control rod nozzle 27 and the blind flange 80 is removed. The auxiliary transfer cask 43 is positioned on the bridge 38 and connected to the adapter spool 93. The control rod drive mechanism 28 and its two associated control rods 25 are removed from the nozzle 27 by the hoist 103 and grapple 105 and drawn upward into the cask 43. The gate 115 at the bottom of the cask 43 is shut, and the isolation valve 95 is closed to prevent coolant escape from the pressure vessel 18. The skirt 109 is raised from the adapter spool 93, and the control rod drive mechanism 28 is transported by the auxiliary transfer cask 43 either to a storage well 47 or to the hot service facility 53, as desired.

The fuel transfer cask 45 is then positioned over the adapter spool 93, and connection is made therebetween. The isolation valve 95 is again opened, and the openings in the disks that close the bottom of the cask 45 are aligned at the desired position. The grappler hoisting and positioning device 135 is employed to position the grappler 137 so that, one-by-one, the five central fuel elements 23 and the two control rod guide tubes 83 in the zone are lifted into the cask 45. After the isolation valve 95 and the transfer cask rotatable disks are closed and the skirt 131 raised, the fuel transfer cask 45 is used to transport these core elements to the reactor service area 17 and deposit them in the storage vault 49.

A core element handling machine 57 is picked up by a mechanism housed within the auxiliary transfer cask 43, and the cask is spotted over the adapter spool 93. After connection is made between the cask 43 and the spool 93, the isolation valve 95 is opened and the core element handling machine 57 is lowered into place in the empty nozzle 27. The connection between the auxiliary transfer cask 43 and the adapter spool 95 is broken, and the auxiliary transfer cask 43 is replaced by the empty fuel transfer cask 45. The skirt 131 is lowered to seal the fuel transfer cask 45 to the adapter spool 93.

The core element handling machine 57 is operated so that the channel 143 is extended downwardly into the space vacated by the seven central core elements. One-by-one, the grappler jaws 145 grasp a peripheral fuel element 23, and the core element transfer machine 57 feeds it upward out of the nozzle 27 to a position where it is engaged by the grappler 137 in the fuel transfer cask 45.

Employment of a core element handling machine 57 of this design permits efficient refueling when the clearance between the tops of the fuel elements and the reactor vessel structure is equal to only about 10 percent of the length of a fuel element 23. This advantage is possible because the machine 57 lifts a peripheral fuel element 23 clear of its pin 72 and then moves it laterally, while at about the same vertical level to a location below the nozzle opening, whence it can be moved axially upward out of the pressure vessel 18.

After the spent fuel element 23 is secured in the storage rack arrangement of the fuel transfer cask 45, the operation is repeated. When six spent fuel elements 23 have been raised to and secured in the cask 45, the bottom door is rotated closed, the isolation valve in the handling machine 57 is closed, and the skirt 131 is raised. The six spent fuel elements 23 are transported to the reactor service area 17 and deposited in the fuel storage vault 49.

After sufficient peripheral fuel elements 23 in one sector of a zone have been removed to clear that sector, instead of bringing the cask 45 back empty to remove six more spent fuel elements 23, it may be filled with six fresh fuel elements. The fresh fuel elements 23 are loaded into the cleared sector, and six more spent fuel elements are removed from the adjacent sector of the zone. Of course, if preferred, all of the spent fuel elements 23 in a zone may be removed before replacement with fresh fuel elements 23 is begun.

When all of the peripheral spent fuel elements 23 in one zone have been unloaded and replaced by fresh fuel elements, the fuel transfer cask 45 is moved away, and the empty auxiliary transfer cask 43 is connected to the adapter spool 93. The core element handling machine 57 is removed from the nozzle 27 by the hoist 103 and grappler 105. The isolation valve 95 is closed, and the skirt 109 raised. The cask 43 transports the handling machine 57 to a storage well 47, deposits it therein, and picks up a control rod drive mechanism 28 and its two associated control rods 25.

The fuel transfer cask 45, carrying five fresh fuel elements 23 and two control rod guide tubes 83 is spotted over the adapter spool 93 and connected thereto. The isolation valve 95 is opened and these seven core elements are individually lowered into the center positions in the zone by the grappler 137. The isolation valve 95 is closed, the cask 45 removed, and the cask 43 connected to the adapter spool 93. The control rod drive mechanism 28 is lowered into the nozzle 27, completing refueling of this zone. The adapter spool 93 and isolation valve 95 are now removed from the nozzle through which refueling has taken place, and they are moved to the next selected nozzle 27 the blind flange 80 is replaced. This procedure is repeated until the desired number of spent fuel elements 23 have been replaced.

Thus, the illustrated reactor 16 can be readily refueled, using the described fueling method, through access openings in the pressure vessel 18 whose total cross sectional area is small compared to the cross sectional area of the reactor core 19. Further, efficient handling of the fuel elements is achieved without providing a large clearance space within the pressure vessel 18 in which to manipulate the fuel elements during loading and unloading of the core. This feature permits a spherical or a short pressure vessel to be employed even though elongated, rod-like fuel elements, which provide good heat transfer characteristics, are used in the reactor core. Accordingly, capital costs are reduced relative to similar reactors which require much larger pressure vessels to properly accommodate a core made up of fuel elements of this type.

Various modifications and changes may be made in the illustrated structure without departing from the spirit Various features of the present invention are set forth in the following claims.

What is claimed is:

1. A nuclear reactor comprising a reactor core formed of a plurality of adjacent, generally vertically extending, elongated core elements, said core elements residing in a plurality of refueling zones, a pressure vessel surrounding said core, said pressure vessel having a height less than twice the length of said core elements, said pressure vessel also having formed therein a plurality of generally regularly spaced access openings located above said core across the top portion of said pressure vessel, a separate access opening centrally overlying each refueling zone, said access openings being of sufficient size to overlie a plurality of core elements and the total cross sectional area of all of said access openings being substantially less than the cross sectional area of said reactor core, nozzles extending vertically upward from said access openings, said nozzles permitting the core elements which directly underlie said access openings to be lifted axially therethrough and thereby withdrawn from the reactor, control rods being provided in at least certain of said refueling zones, said control rods being axially aligned with the access opening for the zone, and removable control rod drive means disposed within the nozzles above said certain zones, said access openings being of sufficient size to permit entry of core element handling means for removing the core elements from the associated core zone.

2. A nuclear reactor comprising a reactor core formed of a plurality of adjacent, generally vertically extending, elongated core elements, said core elements residing in a plurality of refueling zones, a pressure vessel surrounding said core and being proportioned so that the height of said pressure vessel is less than twice the length of said core elements, said pressure vessel having formed therein a plurality of generally regularly spaced access openings located above said core in the top portion of said pressure vessel, a separate access opening overlying the center of each of said refueling zones, said access openings being of sufficient size to overlie a plurality of core elements and the total cross sectional area of all of said access openings being substantially less than the cross sectional area of said reactor core, nozzles extending vertically upward from said access openings, said nozzles permitting the core elements which directly underlie said access openings to be lifted axially therethrough and thereby withdrawn from the reactor, control rods being provided in at least certain of said refueling zones, said control rods being axially aligned with the associated access opening for the zone, control rod drive means removably disposed within the nozzles above said certain zones, a core element handling machine adapted for removable disposition into said nozzles, which machine includes means for extension downward from said nozzle into said reactor core zone and means attached to said extension means for grasping a core element in said zone, moving the core element into axial alignment with said access opening and lifting the core element from said core through said nozzle.

3. A nuclear reactor comprising a generally cylindrical reactor core formed of a plurality of adjacent, generally vertically extending elongated core elements, said core elements residing in a purality of refueling zones, a pressure vessel surrounding said core and proportioned so that the height of said pressure vessel is less than twice the height of said core, said pressure vessel having formed therein a plurality of access openings located above said core and spaced generally regularly across the top portion of said pressure vessel, a separate access opening overlying each of said refueling zones, said access openings being of sufficient size to overlie a plurality of core elements and the total cross sectional area of all of said access openings being substantially less than the cross sectional area of said reactor core, nozzles extending vertically upward from each of said access openings, said nozzles permitting the core elements which directly underlie said access openings to be lifted axially therethrough and thereby withdrawn from the reactor, at least one control rod being provided in at least certain of said refueling zones, said control rods being axially aligned with the associated access opening for the zone, control rod drive means removably disposed within the nozzles above said certain zones, and a core element handling machine adapted for removable disposition into said nozzles, which machine includes means for extension downward from said nozzle into said reactor core zone and means attached to said extension means for grasping a core element in said zone, moving the core element into axial alignment with said access opening and lifting the core element from said core by passage upward through said machine and through said nozzle.

4. A nuclear reactor comprising a generally cylindrical reactor core formed of a plurality of adjacent, generally vertically extending elongated core elements supported at their lower ends and bearing against one another for mutual lateral support, said core elements residing in a plurality of refueling zones, a pressure vessel surrounding said core and proportioned so that the height of said pressure vessel is less than twice the length of said core elements, said pressure vessel having formed therein a plurality of access openings located above said core and spaced generally regularly across the top portion of said pressure vessel, a separate access opening centrally overlying each of said refueling zones, said access openings being of sufficient size to overlie a plurality of core elements and the total cross sectional area of all of said access openings being substantially less than the cross sectional area of said reactor core, a concrete shield surrounding said pressure vessel, nozzles extending vertically upward from said access openings and through said concrete shield, said nozzles permitting the core elements which directly underlie said access openings to be lifted axially therethrough and thereby withdrawn from the reactor, at least one control rod being provided for each refueling zone, said control rod being axially aligned with the associated access opening for the zone, control rod drive means removably disposed within each of said nozzles and adapted to operate a control rod to selectively extend the control rod into the reactor zone below, and a core element handling machine adapted for removable disposition into said nozzles, which machine includes a leg which is extensible downward from said nozzle into said reactor core zone and means attached to said leg for grasping a core element in said zone, moving the core element into axial alignment with said access opening and lifting the core element from said core through said nozzle.

5. A gas-cooled nuclear reactor comprising a spherical pressure vessel, a grid plate disposed at the bottom of said pressure vessel having a plurality of upward extending stand-off pins adapted to position and support fuel elements having passageways formed in their lower ends to receive said pins, a generally cylindrical reactor core formed of a plurality of adjacent, generally vertically extending elongated fuel elements supported on said stand-off pins, said fuel elements residing in a plurality of refueling zones and having lengths substantially greater than one-half the height of the pressure vessel, said fuel elements each having spacing rings near their upper ends in contact with one another to provide mutual lateral support, said pressure vessel having formed therein a plurality of access openings located above said core and spaced generally regularly across the top portion of said pressure vessel, a separate access opening overlying the center of each of said refueling zones, said access openings being of sufficient size to overlie a plurality of fuel elements but the total cross sectional area of all of said access openings being substantially less than the cross sectional area of said reactor core, a concrete shield surrounding said pressure vessel, nozzles extending vertically upward from each of said access openings and through said concrete shield, said nozzles permitting the fuel elements which directly underlie said access openings to be lifted axially therethrough and thereby withdrawn from the reactor, a control rod guide tube disposed in each zone of said core axially below the associated access opening and contiguous with adjacent fuel elements, control rods disposed for axial movement within each of said control rod guide tubes, control rod drive means removably disposed within each of said nozzles and connected to one of said control rods for selectively lowering the rod into the reactor zone below, and a fuel element handling machine adapted for removable disposition in said nozzles, which machine includes a leg which is extensible downward from said nozzle into the associated reactor core zone and then laterally to any position in said core zone and jaw means attached to said leg for grasping a fuel element in said zone, vertically raising said fuel element a sufficient distance to effect disengagement between it and its supporting stand-off pin, moving said fuel element into axial alignment with said access opening and lifting said fuel element from said core through said machine and said nozzle.

6. A method for refueling a zone of a nuclear reactor including a pressure vessel having disposed therewithin a reactor core made up of a plurality of elongated vertically disposed core elements and divided into a plurality of refueling zones, access to each of the refueling zones being by an access opening in the pressure vessel overlying and generally centrally disposed of each zone, the cross sectional area of the access opening being substantially less than the cross sectional area of the underlying zone, which method comprises removing from the reactor all of the core elements in the central portion of a selected zone which are in axial alignment with a selected overlying access opening by lifting them axially through said overlying access opening, removing from the reactor peripheral core elements that are out of axial alignment with said overlying access opening by individually moving each of them laterally substantially into space vacated by the removal of said central core elements to place the core element in axial alignment with said overlying access opening and then lifting the core element upward through said access opening and out of the reactor, replacing peripheral core elements removed using fresh core elements when desired by reversing said last-mentioned removal steps, and replacing core elements in the central portion of said selected zone using fresh core elements if desired by lowering core elements axially in said zone.

7. In a method for refueling a nuclear reactor including a pressure vessel having disposed therewithin a reactor core made up of a plurality of elongated vertically disposed core elements and divided into a plurality of refueling zones, access to each of the refueling zones being by an access opening in the pressure vessel overlying and generally centrally disposed of each zone, the cross sectional area of the access opening being substantially less than the cross sectional area of the underlying zone, the reactor also including nozzles extending upwardly from each of the access openings and control rod drive mechanisms disposed in at least certain of the nozzles for regulating control rods which can be selectively extended downward into the underlying zone of the reactor core, the steps comprising emptying a selected nozzle by withdrawing the control rod drive mechanism disposed therein to allow access to a selected refueling zone, removing all of the core elements in the central portion of said selected zone which are in axial alignment with the overlying access opening from the reactor by lifting them axially through the empty nozzle, and removing a core element that is out of axial alignment with the overlying access opening from the reactor by moving it laterally in the reactor core substantailly into spaced vacated by the removal of the central core elements to place it in axial alignment with the overlying selected access opening and then lifting it upward through said selected nozzle and out of the reactor.

8. In a method for refueling a nuclear reactor including a pressure vessel having disposed therewithin a reactor core made up of a plurality of elongated vertically disposed core elements and divided into a plurality of refueling zones, access to each of the refueling zones being by an access opening in the pressure vessel overlying and generally centrally disposed of each zone, the cross sectional area of the access opening being substantially less than the cross sectional area of the underlying zone, the reactor also including nozzles extending upwardly from each of the access openings and control rod drive mechanisms disposed in at least certain of the nozzles for regulating control rods which can be selectively extended downward into the underlying zone of the reactor core, the steps comprising emptying a selected nozzle by withdrawing the control rod drive mechanism disposed therein to allow access to a selected refueling zone, removing all of the core elements in the central portion of said selected zone from the reactor by lifting them axially through the empty nozzle, positioning a core element handling machine in the empty nozzle which machine includes means for extension downward into the reactor core into the space vacated by the removal of the central core elements, and operating said machine to grasp a core element which is out of axial alignment with the access opening, move it into axial alignment below said selected access opening and lift it upwardly through said selected nozzle and out of the reactor.

9. In a method for refueling a nuclear reactor including a pressure vessel having disposed therewithin a reactor core made up of a plurality of elongated vertically disposed core elements and divided into a plurality of refueling zones, access to each of the refueling zones being by an access opening in the pressure vessel overlying and generally centrally disposed of each zone, the cross sectional area of the access opening being substantially less than the cross sectional area of the underlying zone so the central core elements in a zone are in complete axial alignment with the access opening and the peripheral core elements surrounding the central core elements are out of axial alignment therewith, the reactor also including nozzles extending upwardly from said access openings and control rod drive mechanisms disposed in at least certain of the nozzles for regulating control rods which can be selectively extended downward into the underlying zone of the reactor core, the steps comprising emptying a selected nozzle by withdrawing the control rod drive mechanism disposed therein to allow access to a selected refueling zone, removing all of the core elements in the central portion of said selected zone from the reactor by lifting them axially through the empty nozzle, positioning a core element handling machine in the empty nozzle which machine includes means for extension downward into the reactor core into the space vacated by the removal of the central core elements, lowering said extension means into the reactor core into space vacated by the withdrawn central core elements, grasping a peripheral core element, moving said peripheral core element into space vacated by the withdrawal of the central core elements to place said peripheral core element in axial alignment with said overlying selected access opening, and lifting said peripheral core element upward through said selected nozzle and out of the reactor.

10. In a method for refueling a nuclear reactor including a pressure vessel having disposed therewithin a reactor core made up of a plurality of elongated vertically disposed core elements and divided into a plurality of refueling zones, said core element being supported upon upward extending vertical pins, access to each of the refueling zones being by an access opening in the pressure vessel overlying and generally centrally disposed of each zone, the cross sectional area of the access opening being substantially less than the cross sectional area of the underlying zone so the central core elements in a zone are in complete axial alignment with the access opening and the peripheral core elements surrounding the central core elements are out of axial alignment therewith, the reactor also including nozzles extending upwardly from each of the access openings and control rod drive mechanisms disposed in at least certain of the nozzles for regulating control rods which can be selectively extended downward into the underlying zone of the reactor core, the steps comprising emptying a selected nozzle by withdrawing the control rod drive mechanism disposed therein to allow access to a selected refueling zone, removing the core elements in the central portion of said selected zone from the reactor by lifting them axially through the empty nozzle, positioning a core element transfer machine in the empty nozzle which machine includes means for extension downward into the reactor core into the space vacated by the removal of the central core elements and jaw means for grasping core elements lowering said extension means into the reactor core into space vacated by the withdrawn central core elements, grasping a peripheral core element with the jaw means, vertically raising said peripheral core element to disengage it from its vertical supporting pin, laterally moving said peripheral core element into space vacated by the withdrawal of the central core elements to axially align said peripheral core element with said overlying selected access opening, and lifting said peripheral core element upward through said selected nozzle and out of the reactor.

References Cited by the Examiner
UNITED STATES PATENTS

| | | | |
|---|---|---|---|
| 3,138,535 | 6/1964 | Fortescue et al. | 176—30 |
| 3,179,569 | 4/1965 | Fortescue et al. | 176—30 |
| 3,183,163 | 5/1965 | Gumuchian et al. | 176—30 |

DEWAYNE RUTLEDGE, *Primary Examiner.*

LEON D. ROSDOL, *Examiner.*